(12) United States Patent
Frydman et al.

(10) Patent No.: US 9,774,996 B1
(45) Date of Patent: Sep. 26, 2017

(54) METHODS AND APPARATUS FOR SELF-TRIANGULATION USING MILLIMETER WAVE SYSTEM

(71) Applicant: QUALCOMM Incorporated, San Diego, CA (US)

(72) Inventors: Javier Frydman, Tel-Mond (IL); Amichai Sanderovich, Givat Ada (IL); Reuven Alpert, Atlit (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/172,130

(22) Filed: Jun. 2, 2016

(51) Int. Cl.
*H04W 4/02* (2009.01)
*G01S 5/10* (2006.01)
*G01S 5/14* (2006.01)

(52) U.S. Cl.
CPC .............. *H04W 4/023* (2013.01); *G01S 5/10* (2013.01); *G01S 5/14* (2013.01)

(58) Field of Classification Search
CPC ..... H04W 4/023; H04W 72/0406; G01S 5/14; G01S 5/10; G01S 5/0252; G01S 5/04
USPC ........... 370/334, 328; 455/562.1, 456.1, 101, 455/404.2; 342/450
See application file for complete search history.

(56) References Cited

U.S. PATENT DOCUMENTS

2015/0257121 A1* 9/2015 Siomina .............. H04W 64/003
455/456.6

FOREIGN PATENT DOCUMENTS

DE 102011083239 A1 3/2013
WO WO-2012024434 A1 2/2012

OTHER PUBLICATIONS

International Search Report and Written Opinion—PCT/US2017/031238—ISA/EPO—Jul. 21, 2017.

* cited by examiner

*Primary Examiner* — Inder Mehra
(74) *Attorney, Agent, or Firm* — Knobbe, Martens, Olsen & Bear LLP

(57) ABSTRACT

One aspect of this disclosure provides an apparatus for wireless communication. The apparatus comprises a plurality of antennas and a processing system. The processing system is configured to transmit a first signal to and receive a second signal from an wireless node via each of the antennas. The processing system is further configured to determine a plurality of distances between each of the plurality of antennas and the wireless node based on the signals. The processing system is also configured to identify a position of each of the antennas in relation to the wireless node based on a known distance between two antennas of the plurality of antennas in a pair and the determined distances. The processing system is further also configured to command a movement of the apparatus based, at least in part, on the identified positions.

18 Claims, 8 Drawing Sheets

METHODS AND APPARATUS FOR SELF-TRIANGULATION USING MILLIMETER WAVE SYSTEM

BACKGROUND

Field of the Invention

The present application relates generally to wireless network communications, and, more specifically, to systems, methods, and devices for communicating between wireless devices to determine location of a device.

Description of the Related Art

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), the set of communication protocols used (e.g. Internet protocol suite, SONET (Synchronous Optical Networking), Ethernet, etc.), and the frequency at which communications take place (e.g., 2.4 GHz, 5 GHz, 60 GHz, etc.).

Wireless networks are often preferred when the network elements are mobile and thus have dynamic connectivity needs, or if the network architecture is formed in an ad hoc, rather than fixed, topology. Wireless networks employ intangible physical media in an unguided or guided propagation mode using electromagnetic waves in the radio, microwave, infra-red, optical, etc. frequency bands. Wireless networks advantageously facilitate user mobility and rapid field deployment when compared to fixed wired networks.

One or more mobile devices in a wireless network may be configured to determine its position. Current methods for determining position of mobile devices may require knowledge of locations of static or mobile references with reference to which the mobile device determines its position. However, for truly mobile devices (e.g., cell phones or computers, or other devices that may be taken anywhere in the world), maintaining or communicating a list of deployment locations for wireless nodes (e.g., access points, cells, etc.) may be unfeasible and extremely resource intensive. Alternatively, such a list of deployment locations may be unnecessary where positioning of the mobile device need only be in relation to the single wireless node with which the mobile device is communicating. For example, a mobile device (e.g., an automated drone or an electronic vehicle) may communicate with a charging location. Accordingly, the mobile device may only need to know it's location in relation to the charging location and may not care about the location of the charging location in relation to other charging locations or other wireless nodes. Accordingly, the list of wireless node deployment locations may not be necessary and may take up memory of the mobile device of which there may be limited capacity. However, current methods of positioning of the mobile device may be performed via triangulation, requiring three wireless nodes communicating with the mobile device and a centralized device to determine the position of the device based on the communications. Thus, improved systems, methods, and devices for identifying a position of the mobile device between itself and a single other device are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description," one will understand how the features of the various aspects of this invention provide advantages that include improved communications between access points and stations in a wireless network.

One aspect of this disclosure provides an apparatus for wireless communication, the apparatus. The apparatus comprises a plurality of antennas and a processing system. The processing system is configured to transmit a first signal to an wireless node via each of the plurality of antennas. The processing system is also configured to receive a second signal from the wireless node via each of the plurality of antennas. The processing system is further configured to determine a plurality of distances between each of the plurality of antennas and the wireless node based on the first and second signals. The processing system is also further configured to identify a position of said each of the plurality of antennas in relation to the wireless node based on a known distance between two antennas of the plurality of antennas in a pair and the determined distances. The processor is further also command a movement of the apparatus based, at least in part, on the identified positions.

In some aspects, each of the plurality of antennas of the apparatus is configured to communicate in the 60 GHz range or the millimeter (mmwave) frequency band.

Another aspect disclosed is a method for wireless communication. The method comprises transmitting a first signal to an wireless node via each of a plurality of antennas of an apparatus. The method also comprises receiving a second signal from the wireless node via each of the plurality of antennas. The method further comprises determining a plurality of distances between each antenna of the plurality of antennas and the wireless node based on the first and second signals. The method also further comprises identifying a position of said each of the plurality of antennas in relation to the wireless node based on a known distance between two antennas of the plurality of antennas in a pair and the determined distances. The method further also comprises commanding a movement of the apparatus based, at least in part, on the identified positions.

Another aspect disclosed is another apparatus for wireless communication. The apparatus comprises a plurality of means for transmitting and receiving signals configured to transmit first signals to an wireless node via each of the plurality of means for transmitting and receiving and receive second signals from the wireless node via each of the plurality of means for transmitting and receiving signals. The apparatus also comprises means for determining a plurality of distances between each means for transmitting and receiving signals of the plurality of means for transmitting and receiving signals and an wireless node based on the first and second signals. The apparatus further comprises means for identifying a position of said each of the plurality of means for transmitting and receiving signals in relation to the wireless node based on a known distance between two means for transmitting and receiving signals of the plurality of means for transmitting and receiving signals in a pair and the determined distances. The apparatus also further comprises means for commanding a movement of the apparatus based, at least in part, on the identified positions.

An additional aspect disclosed is a drone. The drone comprises a housing, a plurality of antennas, and a processing system. The antennas are disposed in relation to the housing. The processing system is disposed within the housing and configured to transmit a first signal to a wireless node via each of the plurality of antennas. The processing system is also configured to receive a second signal from the wireless node via each of the plurality of antennas. The processing system is further configured to determine a plurality of distances between each of the plurality of antennas and the wireless node based on the first and second signals. The processing system is also further configured to identify a position of said each of the plurality of antennas in relation to the wireless node based, at least in part, on a known distance between two antennas of the plurality of antennas in a pair and the determined distances. The processing system is further also configured to command a movement of the apparatus based, at least in part, on the identified positions.

An additional aspect disclosed is a gaming system. The gaming system comprises a housing, a plurality of antennas, and a processing system. The plurality of antennas is disposed in relation to the housing. The processing system is disposed within the housing and configured to transmit a first signal to a wireless node via each of the plurality of antennas. The processing system is also configured to receive a second signal from the wireless node via each of the plurality of antennas. The processing system is further configured to determine a plurality of distances between each of the plurality of antennas and the wireless node based on the first and second signals. The processing system is also further configured to identify a position of said each of the plurality of antennas in relation to the wireless node based, at least in part, on a known distance between two antennas of the plurality of antennas in a pair and the determined distances. The processing system is further also configured to command a movement of the apparatus based, at least in part, on the identified positions.

Another aspect disclosed is a computer program product comprising a computer-readable medium comprising instructions that, when executed, cause an apparatus to perform a method of wireless communication. The method comprises transmitting a first signal to an wireless node via each of a plurality of antennas of an apparatus. The method also comprises receiving a second signal from the wireless node via each of the plurality of antennas. The method further comprises determining a plurality of distances between each antenna of the plurality of antennas and the wireless node based on the first and second signals. The method also further comprises identifying a position of said each of the plurality of antennas in relation to the wireless node based on a known distance between two antennas of the plurality of antennas in a pair and the determined distances. The method further also comprises commanding a movement of the apparatus based, at least in part, on the identified positions.

BRIEF DESCRIPTION OF THE DRAWINGS

The above-mentioned aspects, as well as other features, aspects, and advantages of the present technology will now be described in connection with various aspects, with reference to the accompanying drawings. The illustrated aspects, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION

Figure 1:
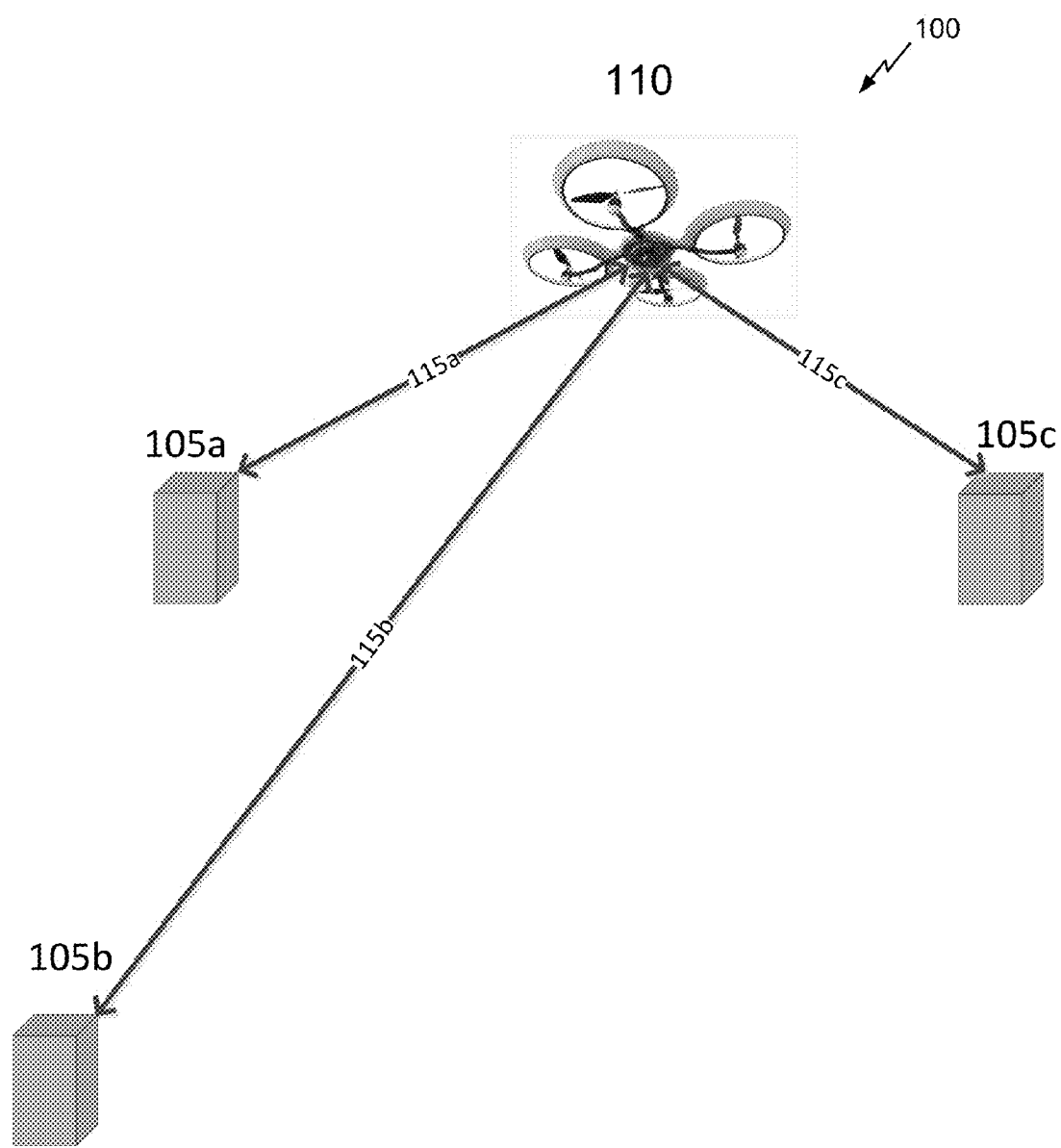
FIG. 1 illustrates one possible organization of a wireless communication system comprising a wireless mobile device and three wireless APs, where the mobile device uses triangulation to determine its position in relation to the three APs.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals may be transmitted according to a high-efficiency 802.11 protocol using orthogonal frequency-division multiplexing (OFDM), direct-sequence spread spectrum (DSSS) communications, a combination of OFDM and DSSS communications, or other schemes. Aspects of the high-efficiency 802.11 protocol may be used for Internet access, sensors, metering, smart grid networks, or other wireless applications. Advantageously, aspects of certain devices implementing the high-efficiency 802.11 protocol using the techniques disclosed herein may include allowing for increased peer-to-peer services (e.g., Miracast, Wi-Fi Direct Services, Social Wi-Fi, etc.) in the same area, supporting increased per-user minimum throughput requirements, supporting more users, providing improved outdoor coverage and robustness, and/or consuming less power than devices implementing other wireless protocols.

In some aspects, a WLAN includes various devices which are the components that access the wireless network. For example, there may be two types of devices: access points ("APs") and clients (also referred to as stations, or "STAs"). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a Wi-Fi (e.g., IEEE 802.11 protocol) compliant wireless link to obtain general connectivity to the Internet or to other wide area networks. In some aspects an STA may also be used as an AP.

An access point ("AP") may also comprise, be implemented as, or known as a NodeB, eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some aspects an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

A wireless node may comprise an access terminal ("AT") or STA, an AP or a relay-capable wireless device having at least one of a STA or AP operation, i.e., a wireless node may have AT or STA operation, AP operation, or both AT/STA and AP operations.

As discussed above, certain of the devices described herein may implement a high-efficiency 802.11 standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications. Although various systems, methods, and apparatuses are described herein with respect to a high-efficiency 802.11 standard, for example, a person having ordinary skill in the art will appreciate that the present disclosure is applicable to other wireless communication standards such as, for example, 802.11ah.

Demand for higher bandwidth capability has been driving wireless communications devices with higher frequencies for many years. Frequency bands of devices have risen from megahertz (MHz) to the low gigahertz (GHz). A next step in this progression (e.g., as specified by IEEE 802.11ad), are frequency bands in the range of 57-64 GHz, often referred to as the "60 GHz frequency band."

The 60 GHz frequency band is an unlicensed band, which features a large amount of bandwidth. The large bandwidth means that a very high volume of information may be transmitted wirelessly. As a result, multiple applications that require transmission of a large amount of data may be developed to allow wireless communication around the 60 GHz band. Examples for such applications include, but are not limited to, wireless high definition TV (HDTV), wireless docking stations, wireless Gigabit Ethernet, and many others.

The 60 GHz frequency band presents challenges to RF designers and engineers, such as absorption of signals by rough surfaces that would be transparent to lower frequencies, as well as issues with line-of-sight (LOS) communication of narrow beams that can easily be blocked by objects (including persons) standing in front of a transceiver device.

FIG. 1 illustrates one possible organization of a wireless communication system (system) 100 comprising a wireless mobile device 110 and three wireless APs 105a-105c, where the mobile device 110 determines its position in relation to the positions of the three APs 105a-105c. The mobile device 110 uses triangulation to determine is position in relation to the three APs 105a-105c.

The system 100 depicted in FIG. 1 includes three APs 105a-105c, a single wireless mobile device (or station) 110, and three communication signals indicated by arrows 115a-115c, each communication signal passing between one of the APs 105 and the mobile device 110. As shown, the mobile device 110 may be located above the three APs 105a-105c, though the mobile device 110 may be positioned at any other position in relation to the three APs 105a-105c.

As depicted, the system 100 may be capable of wireless communications, for example, pursuant to an 802.11ad standard. These wireless communications may be used for a variety of functions, including ranging and locating. Ranging may be the process of estimating a distance that exists between a plurality of points or devices. Ranging may be performed by monitoring round trip times (RTTs) of packets, waveforms, or other transmissions to/from the mobile device 110 and the three APs 105a-105c. For example, RTT may comprise the amount of time it takes for a signal to be transmitted from the mobile device to the AP 105a plus the amount of time it takes for a return signal to be transmitted from the AP 105a back to the mobile device 110. The sum of both of these times equals the RTT. Alternatively, or additionally, other fine timing (FTM) procedures may be used to determine the distances between the mobile device 110 and the APs 105a-105c. For example, observed time difference of arrival (OTDOA), single ended RTT, path loss, etc., may be used to determine the distances. For example, the mobile device 110 may use ranging to determine the distances between itself and one or more of APs 105a-105c. Additionally, or alternatively, the APs 105a-105c may perform ranging between each other.

Locating may be the process of deriving an exact position of one device of the plurality of devices, based on results of the ranging and prior knowledge. For example, based on the distances identified by the ranging described above, the mobile device 110 may determine its position in reference to the three APs 105a-105c when the mobile device 110 knows the locations of the three APs 105a-105c. In the system 100, the three APs 105a-105c may be anchor nodes with known locations. The mobile device 110 performs ranging to determine the distances to each AP 105a-105c along arrows 115a-115c, respectively, where arrows 115a-115c comprise communications between the mobile device 110 and the AP 105a-105c. These distances, in combination with the known locations of the APs 105a-105c (e.g., anchor nodes), may be used to determine the position of the mobile device 110 with respect to the APs 105a-105c. In some aspects, the locations of the APs 105a-105c are either previously known by the mobile device 110 or communicated to the mobile device 110 by one or more of the APs 105a-105c. The locations of the mobile device 110 or the APs 105a-105c may be represented either in terms of geospatial (or geodetic) coordinates, or as a civic address. Some aspects may be more suited to one form of location information; therefore, both the geodetic and civic forms may be used simultaneously Accordingly, via either network based positioning or mobile based positioning, the mobile device 110 may determine its position using triangulation, as described above. In some aspects, the position of the mobile device 110 in relation to the APs 105a-105c may be determined in both two-dimensional and three-dimensional space.

However, often times the mobile device 110 may not need to know its discrete position, but rather may only need its position in relation to a single other device (e.g., a AP 105). For example, if the mobile device 110 need only identify its position in relation to the AP 105a (such as when the mobile device 110 is homing itself to the AP 105a), the communications and calculations discussed above in reference to ranging and locating to determine the absolute position of the mobile device 110 may be unnecessary and excessive. Additionally, maintaining location data requires memory which may be at a premium in some mobile devices 110 and APs 105, and identifying the location information for storage in the memory requires additional deployment efforts.

In mmwave systems as described herein, the ranging (and thus positioning) procedures described above may have higher accuracies than ranging performed via other wireless communication protocols and systems. The higher ranging accuracies may be a result of the smaller wavelengths and higher-sampling rate required for mmwave system operation. For example, in mmwave systems, the analog-digital converter (ADC) of the mobile device 110 may be clocked at 2.64 GHz with a 21 phase fractional polyphase filter, which may yield a resolution of approximately 0.54 cm. In some aspects, this resolution may be referred to as a ranging resolution or a ranging resolution distance or resolution distance. Given an assumed additional 1 cm handicap due to crystal frequency tolerances, the sampling error of mmwave signal positioning is approximately 1.5 cm. Thus, the mmwave capable mobile device 110 may be configured to determine a distance to or position of the AP 105 with an accuracy of +/-1.5 cm.

Figure 2:
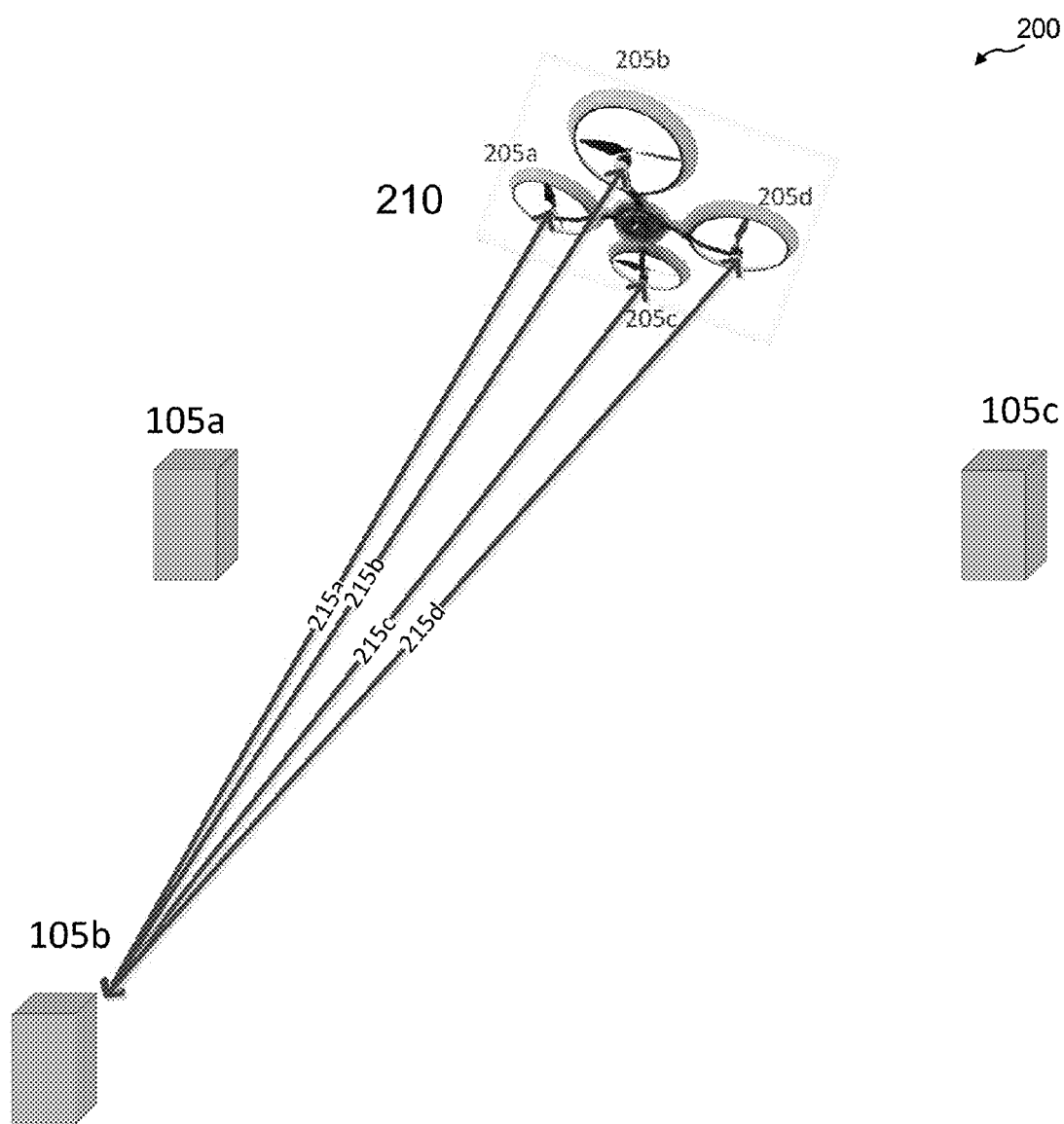
FIG. 2 illustrates one possible organization of another wireless mobile device and the three wireless APs from FIG. 1, where the mobile device uses triangulation to determine its position in relation to a single AP of the three APs.

FIG. 2 illustrates one possible organization of another wireless mobile device 210 and the three wireless APs 105a-105c, where the mobile device 210 uses triangulation to determine its position in relation to the AP 105b of the three APs 105a-105c. Similar to the discussion of FIG. 1, the wireless communication system 200 includes the three APs 105a-105c, another single wireless mobile device (or station) 210, and communication signals 215a-215d passing between the AP 105b and the mobile device 210. However, unlike FIG. 1, the communications signals 215a-215d shown pass between the mobile device 210 and only the AP 105b. As shown, the mobile device 210 may be located above the three APs 105a-105c, though the mobile device 210 may be positioned at any other position in relation to the three APs 105a-105c and need not communicate with APs 105a, 105c, and 105d.

The mobile device 210 as shown in FIG. 2 may include a plurality of antenna modules 205a-205d. Though not shown explicitly in this figure, the antenna modules used in 60 GHz (mmwave) communications may be many factors smaller than antenna modules used in any other larger wavelength communication protocols (e.g., 2.4 GHz or 5 GHz). For example, a 60 GHz antenna module may be approximately 2.5 mm, while a 2.4 GHz antenna module may be approximately 62.5 mm. Due to the very small size of 60 GHz antenna modules, an array of antenna modules is often used in 60 GHz devices. In some aspects, the mobile device 210 may comprise a cell, a robotic device, or a remote control device, such as a drone or quad-copter. With the mobile device 210 shown as a quad-copter, each of the plurality of four antenna modules 205a-205d may be positioned at or near each of the four rotors. However, in alternate aspects, each of the plurality of four antenna modules 205a-205d may be positioned anywhere on the mobile device 210 such that they are each positioned at least a distance greater than the sampling error of 1.5 cm from each other. Additionally, while the mobile device 210 as shown in FIG. 2 includes the plurality of four antenna modules 205a-205d, the mobile device 210 may include more than four antenna modules 205. A plurality of antenna modules 205 may be used to perform self-triangulation. The number of antenna modules 205 may be dependent upon the mobile device 210. For example, if the mobile device 210 moves predominantly in a single plane (e.g., an automated floor vacuum or device with similar mobility constraints), two antenna modules 205 may be the minimum needed to perform self-triangulation. In some aspects, when the mobile device 210 may move in three-dimensions, a minimum of three antenna modules 205a-205c (and an associated processor) may perform self-triangulation. Self-triangulation may be based on signals from the antenna modules 205a-205c, though many more than three antenna modules can be used if desired, which may improve accuracy of the position determination.

The mobile device 210 may also include the components below in FIGS. 3 and 4A-4B. For example, the antenna modules 205a-205d of the mobile device 210 may comprise the antenna modules 205a-205h as discussed further in reference to FIGS. 4A and 4B. The antenna modules 205a-205d may each participate in communication signals 215a-215d, respectively, with the AP 105b. These communications, as described above, may be used to determine the distances or ranges between the antenna modules 205a-205d and the AP 105b, respectively. In some aspects, a processor of the mobile device 210 may perform the procedures described above to determine the distance between each antenna module 205a-205d based on the communication signals 215a-215d, respectively. For example, the RTT procedure may be used to determine the distances between the antenna modules 205a-205d and the AP 105b. Via the RTT procedure, the time it takes to communicate a first signal from the antenna module 205a to the AP 105b and the time it takes to communicate a second signal from the AP 105b to the antenna module 205a are measured. The sum of these times may account for the total travel time between the antenna module 205a and the AP 105b. These times do not include any processing time at either the AP 105b or the antenna module 205a. Accordingly, the total time only includes travel time for the signals. Based on these travel times, and knowing the wavelength of the signal, the distance between the AP 105b and the antenna module 205a can be calculated. Each of the pairs of the antenna modules 205a-205d and the AP 105b may perform similar RTT determinations/measurements. These determined distances or ranges may have accuracies within 1.5 cm, due to the parameters at which the communication signals 215a-215d take place (e.g., 60 GHz communications). In some aspects, the determination of these distances or ranges may be offloaded to a processor of the AP 105b.

Additionally, the mobile device 210 may include one or more internal sensors (not shown in this figure), corresponding to the internal sensors as discussed below in FIG. 3. Alternatively, or additionally, the mobile device 210 may include one or more memory (also not shown in this figure), corresponding to the memory 306 of FIG. 3. The internal sensors may be configured to provide information regarding an orientation of the mobile device 210 (for example a tilt or angle of the mobile device 210 in relation to a horizon (or ground)). Alternatively, or additionally, the memory of the mobile device 210 may provide other a-priory information (for example, a tilt of the AP 105b at installation and/or its actual location). This information may together be used to accurately determine the distance from each antenna module 205a-205d to the AP 105b. For example, the tilt information may enable the determination of the exact position of the antenna modules 205a-205d in relation to the AP 105b. Without the tilt information, the position of the mobile device 210 relative to the AP 105b may only be reduced to a sphere centered on the AP 105b.

Based on the determined distances or ranges, the processor of the mobile device 210 may determine its position relative to the AP 105b by performing a self-triangulation process. As the position of the mobile device 210 is determined relative to a particular other device (e.g., the AP 105b), the self-triangulation may be executed without knowing the AP positions.

For example, the mobile device 210 may comprise the quadcopter as shown and may be configured to land on AP 105b (for example, where AP 105b is a charging station or a delivery point). As described above, the mobile device 210 may comprise the four antenna modules 205a-205d, each mounted below one of the rotors of the quadcopter. The positions of the rotors of the quadcopter may form a square having dimensions of approximately 28 cm between rotors around the square [(a)-(b), (b)-(d), (d)-(c), (c)-(a)] and having dimensions of 40 cm across the square [(a)-(d), (b)-(c)]. It will be noted that, based on the description above, the antenna modules 205a-205d are each spaced at a distance greater than the identified sampling error of 1.5 cm. The processor of the mobile device 210 may execute a ranging procedure for each of the antenna modules 205a-205d to determine their distances in relation to the AP 105b in a periodic or simultaneous manner. Based on the determined distances of each of the antenna modules 205a-205d in relation to the AP 105b, the processor may determine the position or location of the mobile device 210 in relation to the AP 105b. The calculations used to determine the position of the mobile device 210 in relation to the AP 105b are described in detail below in relation to FIGS. 5A-5C.

Figure 3:
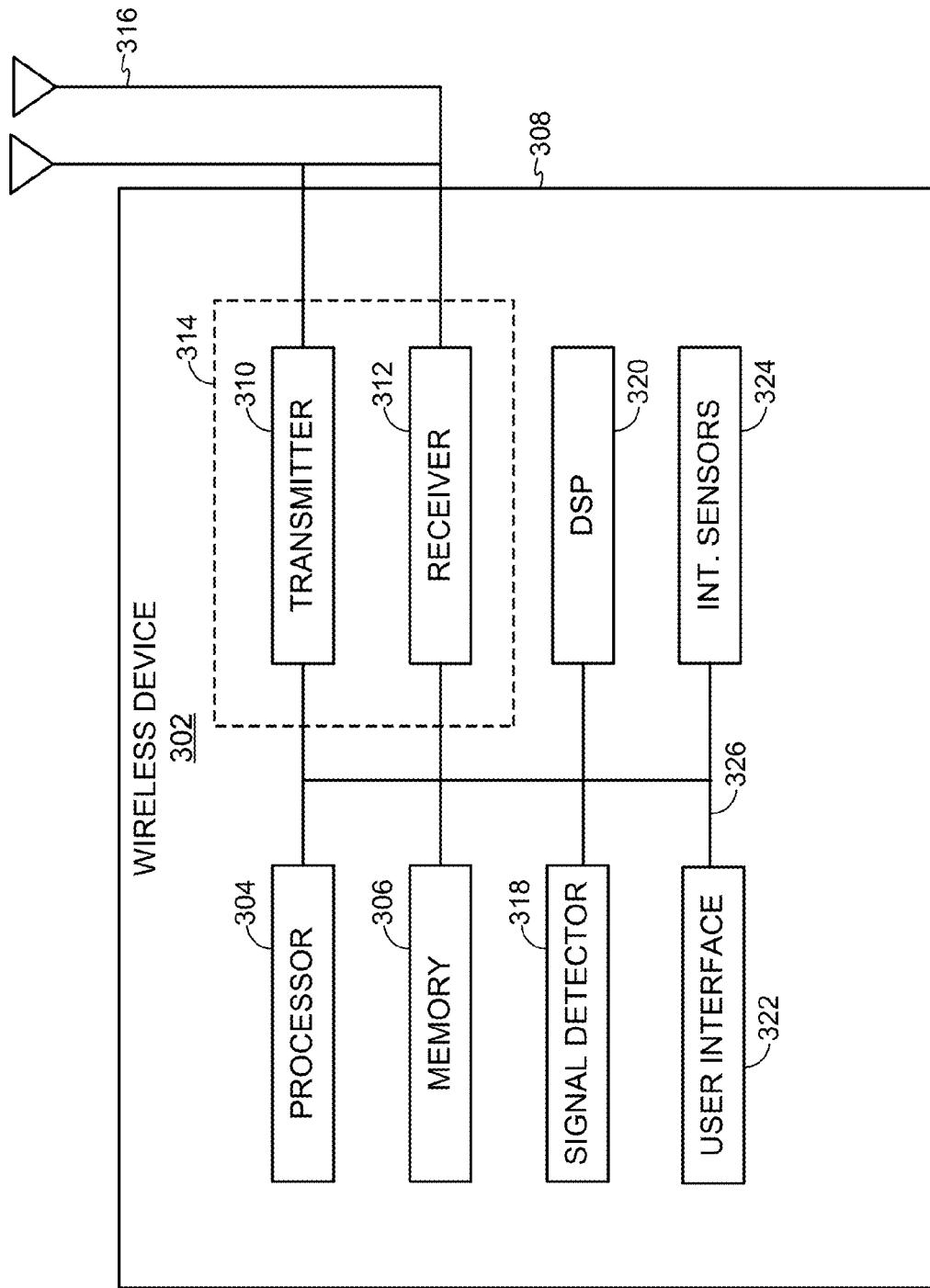
FIG. 3 illustrates an aspect of a device which may comprise the mobile device of FIG. 2.

FIG. 3 illustrates an aspect of a device 302 which may comprise the mobile device 210 of FIG. 2. The device 302 is an example of a wireless device that may be configured to implement the various methods described herein. For example, the device 302 may comprise the mobile device 210 and/or one or more of the APs 105a-105c.

The device 302 may include a processor 304 which controls operation of the device 302. The processor 304 may also be referred to as a central processing unit (CPU). Memory 306, which may include both read-only memory (ROM) and random access memory (RAM), may provide instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein. Accordingly, the processing system may include, e.g., hardware, firmware, and software, or any combination therein.

The device 302 may also include a housing 308 that may include a transmitter 310 and/or a receiver 312 to allow transmission and reception of data between the device 302 and a remote location or device. The transmitter 310 and receiver 312 may be combined into a transceiver 314. An antenna diversity system 316 may be attached to the housing 308 and electrically coupled to the transceiver 314. An example of a transceiver 314 and the antenna diversity system 316 is shown and described in additional detail in FIGS. 4A and 4B. As shown, the antenna diversity system 316 may include 2 antennas as an example, although more than two antennas or less than two antennas are envisioned, as shown in FIGS. 4A and 4B below. The device 302 may also include (not shown) multiple transmitters, multiple receivers, multiple transceivers, and/or multiple antennas diversity systems. In some embodiments, the housing 308 may comprise a body of a drone or a gaming system and the antenna diversity system 316 may be disposed in relation to the housing 308.

The transmitter 310 can be configured to wirelessly transmit messages. The processor 304 may process messages and data to be transmitted via the transmitter 310. The receiver 312 can be configured to wirelessly receive messages. The processor 304 may further process messages and data received via the receiver 312.

The device 302 may also include a signal detector 318 that may be used in an effort to detect and quantify the level of signals received by the transceiver 314. The signal detector 318 may detect such signals as total energy, energy per subcarrier per symbol, power spectral density and other signals. The device 302 may also include a digital signal processor (DSP) 320 for use in processing signals. The DSP 320 may be configured to generate a packet for transmission.

The device 302 may further comprise a user interface 322 in some aspects. The user interface 322 may comprise a keypad, a microphone, a speaker, and/or a display, among others. The user interface 322 may include any element or component that conveys information to a user of the device 302 and/or receives input from the user. The device 302 may also comprise one or more internal sensors 324. In some aspects, the one or more internal sensors 324 may be configure to provide information to the processor 304 or any other component of the device 302. In some aspects, the one or more internal sensors 324 may include a tilt sensor or other component configured to identify an angle of orientation of the device 302 in relation to a horizon. Alternatively, or additionally, other prior knowledge or information may be provided to the device 302 via the memory 306. For example, this prior knowledge or information may include information regarding a tilt of one or more of the APs 105a-105c.

The various components of the device 302 may be coupled together by a bus system 326. The bus system 326 may include a data bus, for example, as well as a power bus, a control signal bus, and a status signal bus in addition to the data bus. Those of skill in the art will appreciate that the components of the device 302 may be coupled together or accept or provide inputs to each other using some other mechanism.

Although a number of separate components are illustrated in FIG. 3, those of skill in the art will recognize that one or more of the components may be combined or commonly implemented. For example, the processor 304 may be used to implement not only the functionality described above with respect to the processor 304, but also to implement the functionality described above with respect to the signal detector 318 and/or the DSP 320. Further, each of the components illustrated in FIG. 3 may be implemented using a plurality of separate elements.

Figure 4A:
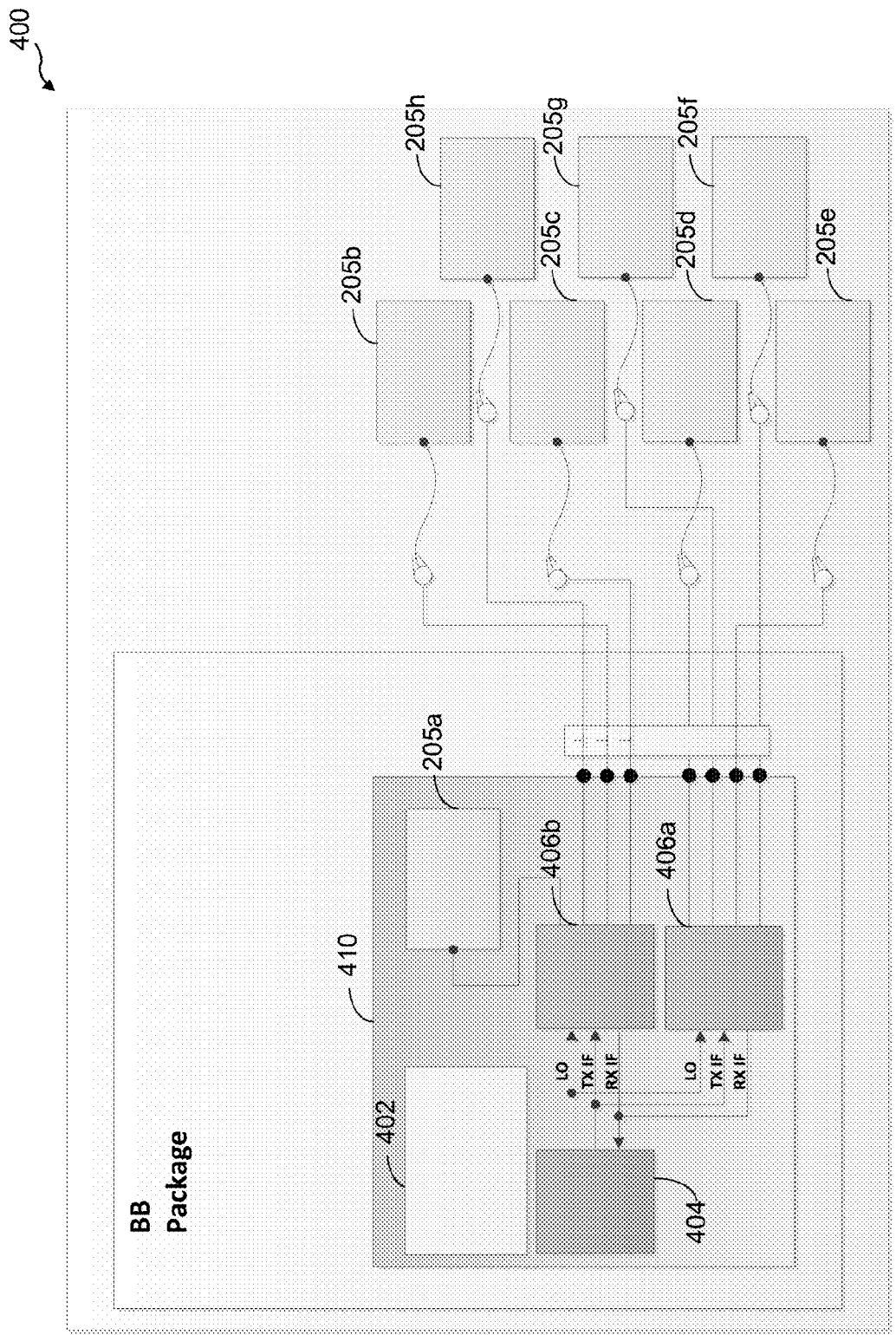
FIG. 4A illustrates an exemplary transceiver and antenna diversity diagram as used in the mobile device of FIG. 2.

FIG. 4A illustrates an exemplary transceiver and antenna diversity diagram as used in the mobile device 210 of FIG. 2. For example, the antenna diversity diagram may comprise one or more of the components of 314 and/or 316 of the mobile device 302 of FIG. 3. The system 400 shown includes a baseband module 402, an analog IF module 404, two switching units 406a-406b, and eight antenna modules 205a-205h. The eight antenna modules 205a-205h may comprise the antennas of the antenna diversity system 316 described above in relation to FIG. 3. The layout of the system 400 may be based on a form factor of the mobile device 210. In some aspects, the system 400 may be configured for transmission and reception of millimeter wave (mmwave) signals or in Wi-Fi signals, or in cellular signals, etc. The baseband module 402 and the antenna modules 205a-205h may be divided between different areas of the mobile device or could be located in the same area of the mobile device. In some aspects, the components described above may be configured to function in RF domains or in any other frequency bands.

The baseband module 402 may be contained within a baseband (BB) silicon layer 410. The BB silicon layer 410 may correspond to a silicon die. One of the antenna modules 205, antenna module 205a, is also located within the baseband silicon layer 410 with the analog IF module 404 and the two switching units 406a-406b. The IF module 404 may comprise an RF module embedded or otherwise implanted or attached to the BB silicon layer 410. In some aspects, the switching units 406a-406b may comprise a multiplexor (MUX) or similar switching component. In some aspects, the switching units 406 may be integrated with the antenna modules 205 or any other module shown in FIG. 4A. The antenna modules 205b-205h are located separate from the baseband silicon layer 410. The antenna modules 205a-205h may include active transmit (TX) and receive (RX) antennas. When transmitting signals, the baseband module 402 and/or the IF module 404 may provide the antenna modules 205a-205h with control, local oscillator (LO), intermediate frequency (IF), and power (DC) signals. In some aspects, the analog IF module 404 may provide the antenna modules 205a-205h with the IF. The control signals may be utilized for functions such as gain control, RX/TX switching, power level control, sensors, and detectors readouts. Specifically, beam-forming based systems 400 may require high frequency beam steering operations which are performed under the control of the baseband module 402. Control signals may be generated by baseband module 402 and may be transferred between baseband module 402 and the antenna modules 205a-205h. The power signals may be DC voltage signals that power the various components of the antenna modules 205a-205h. In some aspects, the components 402, 404, 406a-406b, and 410 may be replaced by a modem or other communications device and a single switching unit or components.

In some aspects, the antenna modules 205a-205h may be used to generate signals to be transmitted through an associated antenna array and process signals received via the associated antenna array, where the associated antenna array comprises the active TX and RX antennas. For transmission, the antenna modules 205a-205h may perform up-conversion of IF signals to signals using a mixer (not shown) and may transmit the signals through one or more TX antennae according to the control of the control signal. In the receive direction, the antenna modules 205a-205h may receive signals (e.g., at the frequency band of 60 GHz), through one or more active RX antennae, and perform down-conversion of the received signals, using the mixer, to IF signals using the LO signals, and send the IF signals to the baseband module 402. The operation of the antenna modules 205a-205h may be controlled by the control signal, but certain control information (e.g., feedback signals) may be sent back to the baseband module 402.

While the system 400 described above includes eight antenna modules 205a-205h, antenna diversity as described herein, is a transmission method using more than one antenna module 205 to receive or transmit signals along different propagation paths to compensate for multipath interferences. The communications performed by the antenna modules 205a-205h described herein may be configured such that only one of the antenna modules 205a-205h communicates at any specific time. This may be different from cellular communications, where more than one antenna is allowed to transmit and/or receive at the same time. Each of the antenna modules 205a-205h may communicate with the AP 105b or any other external device, although only one of the antenna modules 205a-205h may be active at a given time. In some aspects, more than one of the antenna modules 205a-205h may be configured to communicate with the AP 105b at the same time. For example, one or more of the antenna modules 205a-205h may be configured to communicate during overlapping time intervals and/or simultaneously. In some aspects, the antenna modules 205a-205h may be configured to alternate between individual communication (where only one antenna module 205 is active at the given time) and group communication (where more than one antenna module 205 is active at the given time) activation. In some aspects, one antenna module 205 may be transmitting while another antenna module 205 is receiving.

Figure 4B:
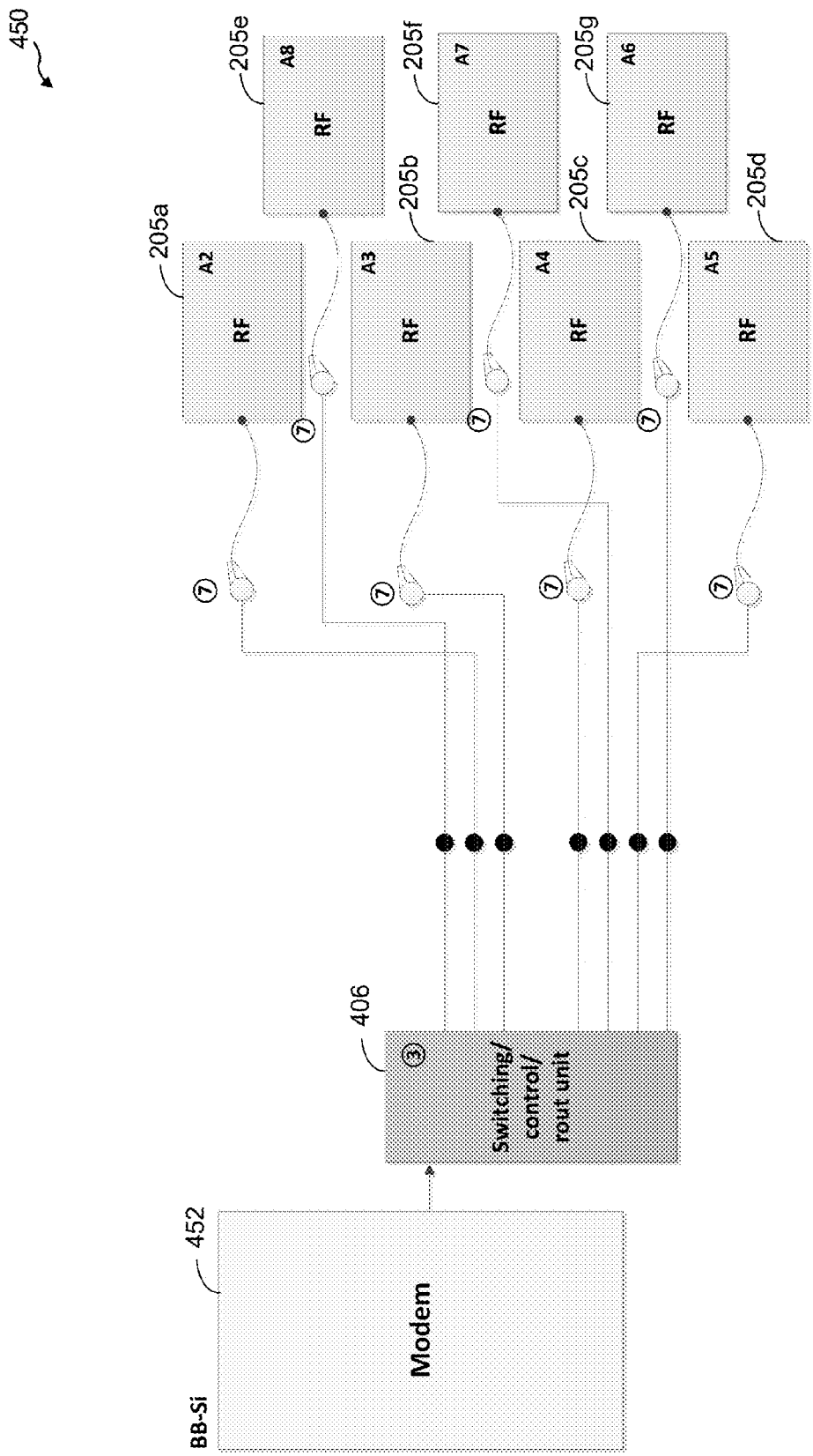
FIG. 4B illustrates another exemplary transceiver and antenna diversity diagram as used in the mobile device of FIG. 2.

FIG. 4B illustrates another exemplary transceiver and antenna diversity system 450 as used in the mobile device 210 of FIG. 2. For example, the antenna diversity system 450 may comprise one or more of the components of 314 and/or 316 of the mobile device 302 of FIG. 3. The system 450 shown includes a modem 452, a switching unit 406, and seven antenna modules 205a-205g. The seven antenna modules 205a-205g may comprise the antennas of the antenna diversity system 316 described above in relation to FIG. 3. The layout of the system 450 may be based on a form factor of the mobile device 210. In some aspects, the system 450 may be configured for transmission and reception of millimeter wave (mmwave) signals or in Wi-Fi signals, or in cellular signals, etc. The modem 452 and the antenna modules 205a-205g may be divided between different areas of the mobile device or could be located in the same area of the mobile device. In some aspects, the components described above may be configured to function in RF domains or in any other frequency bands.

The modem 452 may comprise any communication device configured to transmit and/or receive communications via the antenna modules 205a-205g. For example, the modem 452 may include the transmitter 310 and the receiver 312 or the transceiver 314 of FIG. 3. be contained within a baseband (BB) silicon layer 410. In some aspects, the switching unit 406 may comprise any switching component configured to couple the antenna modules 205a-205g to the modem 452. In some aspects, the switching unit 406 may be configured to couple only one of the antenna modules 205a-205g to the modem 452 at a time such that only one antenna module 205a-205g may be used by the modem 452 to transmit or receive a signal at a given time.

The antenna modules 205 of FIG. 4B may be similar to those of FIG. 4A need not be described again. Additionally, the switching unit 406 may be similar to the switching units 406a-406b discussed in FIG. 4A above and need not be described again. In some aspects, the switching unit 406 may be integrated with the modem 452. In some aspects, the switching unit 406 may comprise a plurality of switching units.

While the modem 452 described above includes seven antenna modules 205a-205g, antenna diversity as described herein, is a transmission method using more than one antenna module 205 to receive or transmit signals along different propagation paths to compensate for multipath interferences. The communications performed by the antenna modules 205a-205g described herein may be configured such that only one of the antenna modules 205a-205g communicates at any specific time. This may be different from cellular communications, where more than one antenna is allowed to transmit and/or receive at the same time. In some aspects, more than one of the antenna modules 205a-205g may be configured to communicate with the AP 105b at the same time. Each of the antenna modules 205a-205g may communicate with the AP 105b or any other external device, although only one of the antenna modules 205a-205g may be active at a given time.

Figure 5B:
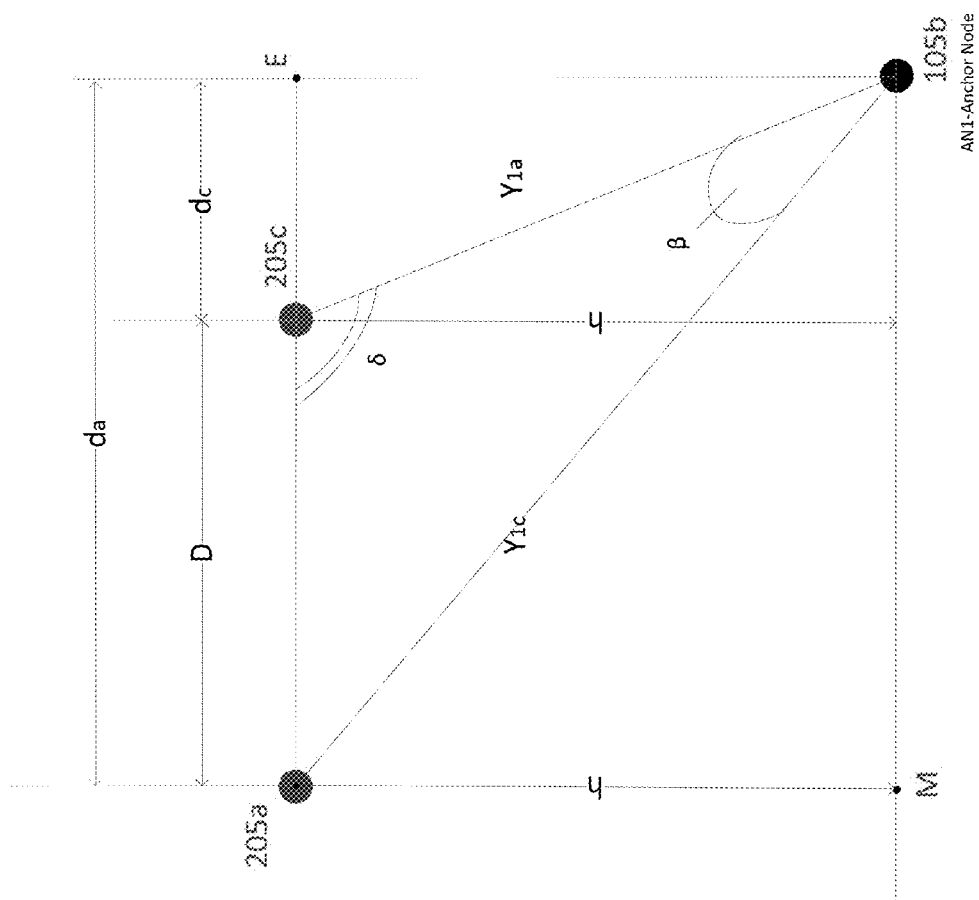
FIG. 5B illustrates a diagram of geometries used by the mobile device to determine its position in relation to the AP in FIG. 2 when the mobile device is positioned at an offset above the AP.
Figure 5A:
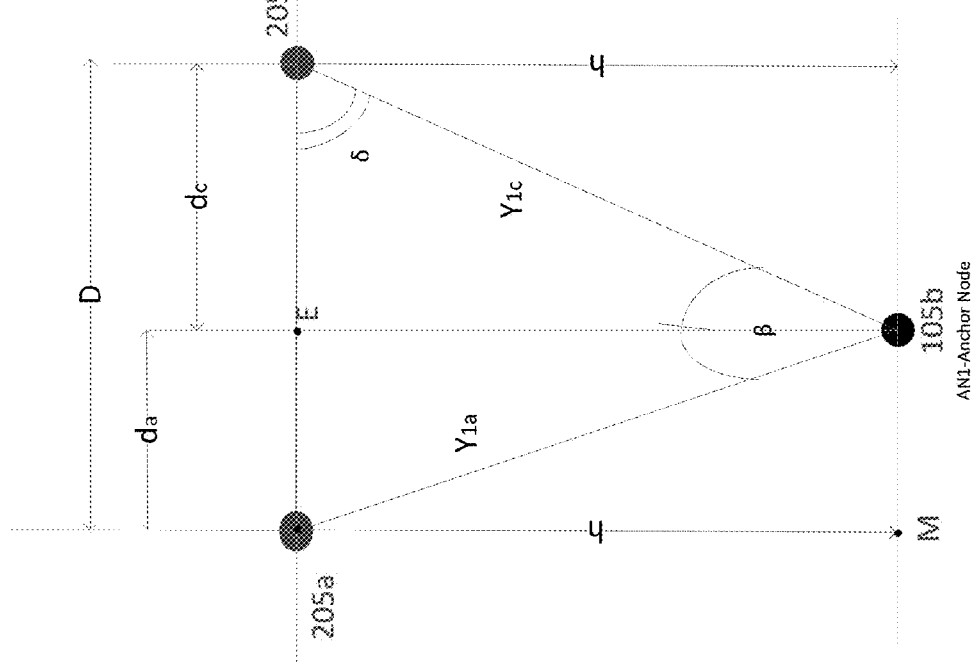
FIG. 5A illustrates a diagram of geometries used by the mobile device to determine its position in relation to the access in FIG. 2 point when the mobile device is positioned directly above the AP.

FIG. 5A illustrates a diagram of geometries used by the mobile device 210 to determine its position in relation to the AP 105b in FIG. 2 when the mobile device 210 is positioned above the AP 105b such that the mobile device 210 is "over" the AP 105b. FIG. 5A shows three points and various triangles formed therebetween. The three points correspond to the positions of the antenna module 205a, the antenna module 205c, and the AP 105b. The antenna modules 205a and 205c form a horizontal axis a-c in relation to the AP 105b (which may be known via the internal sensors of the mobile device 210). As shown, the distance D is the distance between antenna modules 205a and 205c, while the distance $Y_{1a}$ is the distance between the antenna module 205a and the AP 105b and the distance $Y_{1c}$ is the distance between the antenna module 205c and the AP 105b. The height of the mobile device 210 above the AP 105b is shown by height h. For example, this height h may correspond to the vertical distance (or plumb) between the AP 105b and the mobile device 210. The height h is the same across the axis formed by antenna modules 205a and 205c when the mobile device is not tilted with respect to the horizon or the ground (e.g., the AP 105b) or when the mobile device has existing or a-priori knowledge of the tilt of the mobile device 210. In such aspects as shown, the internal sensors of the mobile device 210 may indicate the tilt of the mobile device 210 is zero (e.g., the mobile device is not tilted relative to the horizon). As the antenna modules 205a and 205c are both in the same horizontal plane forming the axis, the distance h corresponding to the height above the AP 105b is the same for both. The distances $d_a$ and $d_c$ correspond to the horizontal distances from the AP 105b to the antenna modules 205a and 205c, respectively, and, in sum, are equal to the distance D ($D = d_a + d_c$).

As described above, the processor of the mobile device 210 (or the processor of the AP 105b when calculations are offloaded from the mobile device 210) may determine the distances $Y_{1a}$ and $Y_{1c}$ based on the procedures discussed above of the communications therebetween. Once the distances $Y1a$ and $Y1c$ are known, the processor may determine the height h and the distances $d_a$ and $d_c$ as discussed below.

The value D is a design value known from the placement of the antenna modules 205a and 205c on the mobile device 210. Following the Cosine theorem, and as shown in FIG. 5A, the angle β of the triangle formed between antenna modules (indicated as points) 205a, 205c, and AP 105b may be calculated as shown in Equations 1:

$$D^2 = Y_{1a}^2 + Y_{1c}^2 - 2*Y_{1a}*Y_{1c}*\cos(\beta) \qquad \text{(Equation 1-1)}$$

$$\beta = \cos^{-1}\left(\frac{(Y_{1a}^2 + Y_{1c}^2) - D^2}{2 * Y_{1a} * Y_{1c}}\right) \quad \text{(Equation 1-2)}$$

By the Sine theorem on the triangle formed between antenna modules (indicated as points) 205a, 205c, and AP 105b, the angle δ may be calculated as shown in Equations 2:

$$\frac{D}{\sin(\beta)} = \frac{Y_{1a}}{\sin(\delta)} \quad \text{(Equation 2-1)}$$

$$\delta = \sin^{-1}\left(\frac{Y_{1a}}{D} * \sin(\beta)\right) \quad \text{(Equation 2-2)}$$

Based on Equations 1 and 2, and the relationship between D, da, dc, and h, da, dc, and h may be solved for as shown in Equations 3, below:

$$d_c = \cos(\delta) \quad \text{(Equation 3-1)}$$

$$d_c = Y_{1c} * \cos\left(\sin^{-1}\left(\frac{Y_{1a}}{D} * \sin\left(\cos^{-1}\left(\frac{(Y_{1a}^2 + Y_{1c}^2) - D^2}{2 * Y_{1a} * Y_{1c}}\right)\right)\right)\right) \quad \text{(Equation 3-2)}$$

$$d_a + d_c = D \quad \text{(Equation 3-3)}$$

$$d_a = D - d_c = D - Y_{1c} * \cos(\delta) \quad \text{(Equation 3-4)}$$

$$h = Y_{1c} * \sin(\delta) \quad \text{(Equation 3-5)}$$

When the height h is determined for all pairs of antenna modules 205a-205d, the processor of the mobile device 210 may verify the vertical position of the mobile device 210 in reference to the AP 105b because when the mobile device 210 is level (e.g., not tilted) above the AP 105b, the height h should be the same for all antenna modules 205a-205d. With the known distance D and the determined distances $Y_{1a}$ and $Y_{1c}$, $d_a$ and $d_c$ can be calculated and used to calculate h.

FIG. 5B illustrates a diagram of geometries used by the mobile device 210 to determine its position in relation to the AP 105b in FIG. 2 when the mobile device 210 is positioned at an offset above the AP 105b. FIG. 5B shows the same three points as FIG. 5A. As in FIG. 5A, the three points correspond to the positions of the antenna module 205a, the antenna module 205c, and the AP 105b. However, the positions of these points have changed, where the antenna modules 205a and 205c are no longer positioned directly above the AP 105b, but rather are offset from the AP 105b. Accordingly, the triangle formed by the three points is an obtuse triangle. Additionally, triangles are shown formed in relation to the three points. The antenna modules 205a and 205c again form a horizontal axis a-c in relation to the AP 105b (which may be known via the internal sensors of the mobile device 210 and correspond to a tilt of '0'). The distance D is the distance between antenna modules 205a and 205c, while the distance $Y_{1a}$ is the distance between the antenna module 205a and the AP 105b and the distance $Y_{1c}$ is the distance between the antenna module 205c and the AP 105b. The height of the mobile device 210 above the AP 105b is shown by height h, and may correspond to the vertical distance between the AP 105b and the a-c axis. As the antenna modules 205a and 205c are both in the same horizontal plane forming the a-c-axis, the distance h corresponding to the height above the AP 105b is the same for both. The distances $d_a$ and $d_c$ correspond to the horizontal distances from the AP 105b to the antenna modules 205a and 205c. However, unlike in FIG. 5A above, the distances $d_a$ and $d_c$ in sum are not equal to the distance D. Instead, as shown in FIG. 5B, (D+$d_c$=$d_a$).

As described above, the processor of the mobile device 210 (or of the AP 105b when calculations are offloaded from the mobile device 210) may determine the distances $Y_{1a}$ and $Y_{1c}$ based on the ranging procedures of the communications therebetween, as discussed above. Once the distances Y1a and Y1c are known, the processor may determine the height h as discussed below.

Equations 1-2 described above remain the same for the obtuse triangle situation shown in FIG. 5B. Accordingly, based on these equations as applied to FIG. 5B and the relationship between D, da, dc, and h, da, dc, and h may be solved for as shown in Equations 4, below:

$$d_c = Y_{1c} * \cos(180 - \delta) = -Y_{1c} \cos(\delta) \quad \text{(Equation 4-1)}$$

$$d_a = D + d_c \quad \text{(Equation 4-2)}$$

$$d_a = D - Y_{1c} \cos(\delta) \quad \text{(Equation 4-3)}$$

$$h = Y_{1c} * \sin(180 - \delta) = Y_{1c} * \sin(\delta) \quad \text{(Equation 4-4)}$$

When the height h is determined for all pairs of antenna modules 205a-205d, the processor of the mobile device 210 may determine the position of the mobile device 210 in reference to the AP 105b. As mentioned above, because when the mobile device 210 is level above the AP 105b, the height h should be the same for all antenna modules 205a-205d. With the known distance D and the determined distances $Y_{1a}$ and $Y_{1c}$, $d_a$ and $d_c$ can be calculated and used to calculate h.

Figures 5C, 5D:
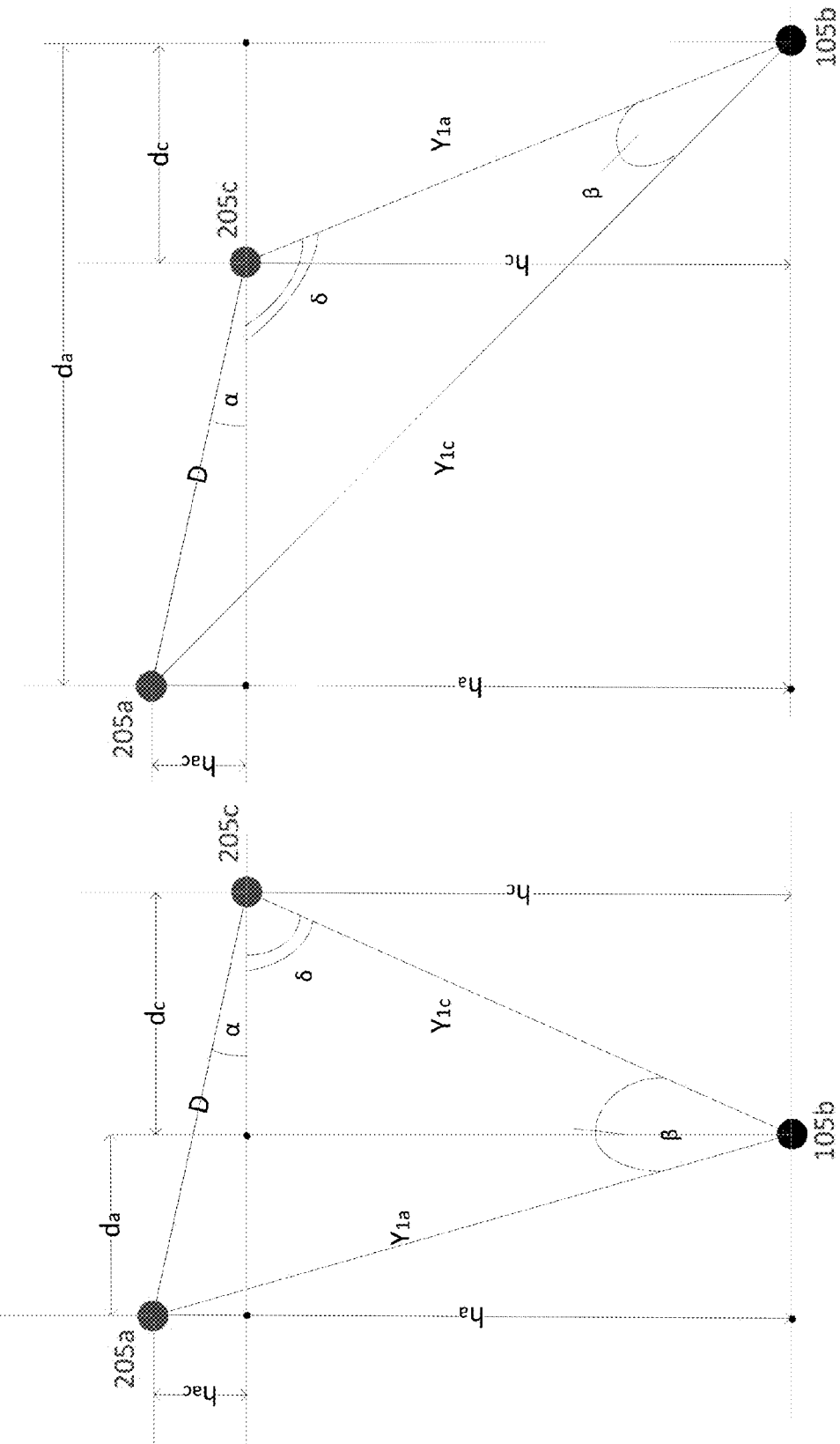
FIG. 5C illustrates a diagram of geometries used by the mobile device to determine its position in relation to the AP in FIG. 2 when the mobile device is positioned directly above the AP but is tilted in relation to a horizon or the AP.
FIG. 5D illustrates a diagram of geometries used by the mobile device to determine its position in relation to the AP in FIG. 2 when the mobile device is positioned at an offset above the AP but is tilted in relation to a horizon or the AP.

FIG. 5C illustrates a diagram of geometries used by the mobile device 210 to determine its position in relation to the AP 105b in FIG. 2 when the mobile device 210 is positioned directly above the AP 105b but is tilted in relation to a horizon or the AP 105b. FIG. 5C shows the same three points as FIGS. 5A and 5B. However, the positions of these points have again changed as compared to FIGS. 5A and 5B, where the antenna modules 205a and 205c are no longer forming a horizontal axis a-c above the AP 105b, but rather are positioned forming the axis a-c at an angle α in relation to a horizon comprising the AP 105b. As above, triangles are shown formed in relation to the three points. Additionally, the angle α is shown between the axis a-c and the (supposed) axis of the ground or horizon on which the AP 105b is installed. The angle α of the axis a-c in relation to the AP 105b may be known via the internal sensors (e.g., internal sensors 324 of FIG. 3) of the mobile device 210 (or some other method). The distance D is still the distance between the antenna modules 205a and 205c, while the distance $Y_{1a}$ is again the known design distance between the antenna module 205a and the AP 105b. The distance $Y_{1c}$ is still the distance between the antenna module 205c and the AP 105b as measured via the ranging procedures described above. The height of the mobile device 210 above the AP 105b is now not shown simply by the height of the a-c axis as in FIGS. 5A and 5B. Instead, each antenna module 205a and 205c has its own height, as they are at different heights above the AP 105b. Accordingly, height $h_a$ corresponds to the height of the antenna module 205a above the AP 105b, while height $h_c$ corresponds to the height of the antenna module 205c above the AP 105b. The distances $d_a$ and $d_c$ correspond to the horizontal distances (in relation to the ground, or horizon axis) from the AP 105b to the antenna modules 205a and 205c. The distances $d_a$ and $d_c$ in sum are related to the distance D as (D cos $\alpha$=$d_c$+$d_a$).

As described above, the processor of the mobile device 210 (or of the AP 105b when calculations are offloaded from the mobile device 210) may determine the distances $Y_{1a}$ and $Y_{1c}$ based on the ranging procedures of the communications therebetween. Once the distances $Y_{1a}$ and $Y_{1c}$ are known, the processor may determine the heights $h_a$ and $h_c$ as discussed below.

Equations 1 described above remain the same for the situation shown in FIG. 5C. The Sine theorem is used to extend Equations 2 and 3 above, resulting in Equations 5 below:

$$\frac{D}{\sin(\beta)} = \frac{Y_{1a}}{\sin(\alpha + \delta)} \quad \text{(Equation 5-1)}$$

$$\delta = \sin^{-1}\left(\frac{Y_{1a}}{D} * \sin(\beta)\right) - \alpha \quad \text{(Equation 5-2)}$$

Additionally, the relationships between D, $d_a$, $d_c$, and h have changed, as shown in Equations 6, below:

$$d_c = Y_{1c} * \cos\left(\sin^{-1}\left(\frac{Y_{1a}}{D} * \sin\left(\cos^{-1}\left(\frac{(Y_{1a}^2 + Y_{1c}^2) - D^2}{2 * Y_{1a} * Y_{1c}}\right)\right)\right) - \alpha\right) \quad \text{(Equation 6-1)}$$

$$d_a + d_c = D * \cos(\alpha) \quad \text{(Equation 6-2)}$$

$$d_a = D*\cos(\alpha) - d_c = D*\cos(\alpha) - Y_{1c}*\cos(\delta) \quad \text{(Equation 6-3)}$$

Based on these values, the heights $h_a$ and $h_c$ can be determined, as shown in Equations 7:

$$h_c = Y_{1c}*\sin(\delta) \quad \text{(Equation 7-1)}$$

$$h_a = h_c + h_{ac} = Y_{1c}*\sin(\delta) + D*\sin(\alpha) \quad \text{(Equation 7-2)}$$

Similarly, heights $h_x$ and $Y_{1x}$ may be determined for each of the remaining antenna modules 205b and 205d. Based on the heights $h_x$ and the distances $Y1_x$ for each of the antenna modules 205, the processor of the mobile device 210 may determine the position of the mobile device 210 in reference to the AP 105b.

FIG. 5D illustrates a diagram of geometries used by the mobile device 210 to determine its position in relation to the AP 105b in FIG. 2 when the mobile device 210 is positioned at an offset above the AP 105b but is tilted in relation to a horizon or the AP 105b. FIG. 5D shows the same three points as FIGS. 5A-5C. However, the positions of these points have again changed as compared to FIGS. 5A-5C, where the antenna modules 205a and 205c are no longer forming a horizontal axis a-c above the AP 105b, but rather are positioned forming the axis a-c at an angle $\alpha$ in relation to a horizon comprising the AP 105b at an offset above the AP 105b. As above, triangles are shown formed in relation to the three points. Additionally, the angle $\alpha$ is shown between the axis a-c and the (supposed) axis of the ground or horizon on which the AP 105b is installed. The angle $\alpha$ of the axis a-c in relation to the AP 105b may be known via the internal sensors (e.g., internal sensors 324 of FIG. 3) of the mobile device 210 (or some other method). The distance D is still the distance between the antenna modules 205a and 205c, while the distance $Y_{1a}$ is again the known design distance between the antenna module 205a and the AP 105b. The distance $Y_{1c}$ is the distance between the antenna module 205c and the AP 105b as measured via the ranging procedures described above. The height of the mobile device 210 above the AP 105b is now not shown simply by the height of the a-c axis as in FIGS. 5A and 5B. Instead, each antenna module 205a and 205c has its own height, as they are at different heights above the AP 105b. Accordingly, height $h_a$ corresponds to the height of the antenna module 205a above the AP 105b, while height $h_c$ corresponds to the height of the antenna module 205c above the AP 105b. The distances $d_a$ and $d_c$ correspond to the horizontal distances (in relation to the ground, or horizon axis) from the AP 105b to the antenna modules 205a and 205c. The distances $d_a$ and $d_c$ in sum are related to the distance D as (D cos $\alpha$+$d_c$=$d_a$).

As described above, the processor of the mobile device 210 (or of the AP 105b when calculations are offloaded from the mobile device 210) may determine the distances $Y_{1a}$ and $Y_{1c}$ based on the ranging procedures of the communications therebetween. Once the distances $Y_{1a}$ and $Y_{1c}$ are known, the processor may determine the distances $d_a$ and $d_c$ and the heights $h_a$ and $h_c$ as discussed below.

Equations 1 and 5 described above may be applied to the situation shown in FIG. 5D. Accordingly, the distances $d_a$, $d_c$, and h may be determined from Equations 1 and 5 and the relationships between D, $d_a$, $d_c$, as shown in Equations 8 (similar to Equations 6), below:

$$d_c = Y_{1c}*\cos(180-\delta) = -Y_{1c}\cos(\delta) \quad \text{(Equation 8-1)}$$

$$d_a - d_c = D*\cos(\alpha) \quad \text{(Equation 8-2)}$$

$$d_a = D*\cos(\alpha) - Y_{1c}\cos(\delta) \quad \text{(Equation 8-3)}$$

As shown, these Equations 8 are similar to the Equations 6 described above. Based on these values, the heights $h_a$ and $h_c$ can be determined, as shown in Equations 9 (similar to Equations 7):

$$h_c = Y_{1c}*\sin(180-\delta) = Y_{1c}*\sin(\delta) \quad \text{(Equation 9-1)}$$

$$h_a = h_c + h_{ac} = Y_{1c}*\sin(\delta) + D*\sin(\alpha) \quad \text{(Equation 9-2)}$$

Accordingly, the configuration of FIG. 5D may be satisfied by the Equations of the configuration of FIG. 5C. The Equations 8 and 9 may be further applied to the configurations of FIGS. 5A and 5C, where the tilt angle $\alpha$ is set to zero (e.g., no tilt).

Similarly, heights $h_x$ and $Y_{1x}$ may be determined for each of the remaining antenna modules 205b and 205d. Based on the heights $h_x$ and the distances $Y1_x$ for each of the antenna modules 205, the processor of the mobile device 210 may determine the position of the mobile device 210 in reference to the AP 105b. Once the position of the mobile device 210 in reference to the AP 105b is known, the mobile device 210 may be commanded to move based, at least in part, on the determined position. For example, the mobile device 210 may be commanded to land on or at the AP 105b.

The invention disclosed herein may reduce deployment efforts of APs and other devices that may communicate with others and/or be used to establish position relative to another device. As the positioning between the devices is relative, absolute locations of the APs and other devices need not be identified and stored (however, if absolute position of the mobile device is desired, the absolute position of the reference AP may need to be determined as well). Accordingly, any two devices may execute the above described ranging and positioning procedures, thus enabling any two units to perform homing procedures in relation to one another. Such homing procedures may be most useful when both of the devices (e.g., the mobile device and the AP or anchor node) are mobile and not static. The homing procedures may be used to command one or both of the devices to move based, at least in part, on the determined positions. While the devices as described herein are designated as being either APs or mobile devices (e.g., STAs), these labels may be arbitrary. Accordingly, the APs and the mobile devices may be interchangeable. Instead, the AP may be considered a "responder" configured to respond to ranging procedures initiated by the mobile device, or "targeter". The "targeter" may comprise the mobile device that initiates the ranging, distancing, and positioning processes and that has the antenna diversity capabilities described herein. In some aspects, any device that could be a targeter may also be or may also be used as a responder.

Additionally, or alternatively, such homing procedures may be used in emergency situations. For example, during a disaster, a helicopter may need to determine its position in relation to a landing point, a rescue point, or delivery point. Given various circumstances (for example, inclement weather or unfavorable terrain), the person being rescued or receiving the delivery may be moving. Accordingly, while their absolute location may be unknown, the homing procedure described above may be used to allow the helicopter to "home" into the position of the person using the ranging and positioning procedures discussed above. Alternatively, an ambulance or a first responder may be able to determine an exact position of an injured party, where the injured party's mobile device could be designated the AP for the ranging and positioning procedures described above and the ambulance or first responder may comprise the mobile device.

Alternatively, or additionally, the ranging and positioning procedures described herein may be applied to gaming. For example, a gaming console or system (i.e., a standalone gaming system or one integrated with another device) may act as the mobile device, while various sensors (e.g., used as APs or anchor nodes) are located on a user or object. The gaming system may use the ranging and positioning procedures described above to track movement and/or position of the user or the object (i.e., each of the APs located on the user or object) and react to this movement and/or position as part of the gaming experience. Alternatively, or additionally, such user and object tracking may be applied to any other interactive experience, such as augmented or virtual reality experiences and systems, various machinery control systems, robotics systems where control of the robotic entity mimics movements of a user, among others. For example, in these various configurations, a control device may operate as the mobile device having diversity antennas placed thereon with spacing as described above. The processor of the control device (or a processor coupled to the control device) may use the ranging and positioning procedures described above to track a plurality of APs or anchor nodes (e.g., positioned in bracelets or other wearable or implantable gear). The movement of the APs may be conveyed or otherwise translated into movement or control of virtual experience, the robotics, machinery, etc. Alternatively, or additionally, the designation of the APs and mobile device may be switched as to their location (e.g., the sensors on the user or object may each be diversity antennas for a control module attached to the user or object, thus forming a mobile device).

Additionally, in the invention as described herein (e.g., system 200), only two sources of accuracy are imposed (the mobile device 210 and the AP 105b), which results in a more accurate measurement when compared to regular triangulation (see FIG. 1), where four sources of accuracy are imposed.

Figure 6:
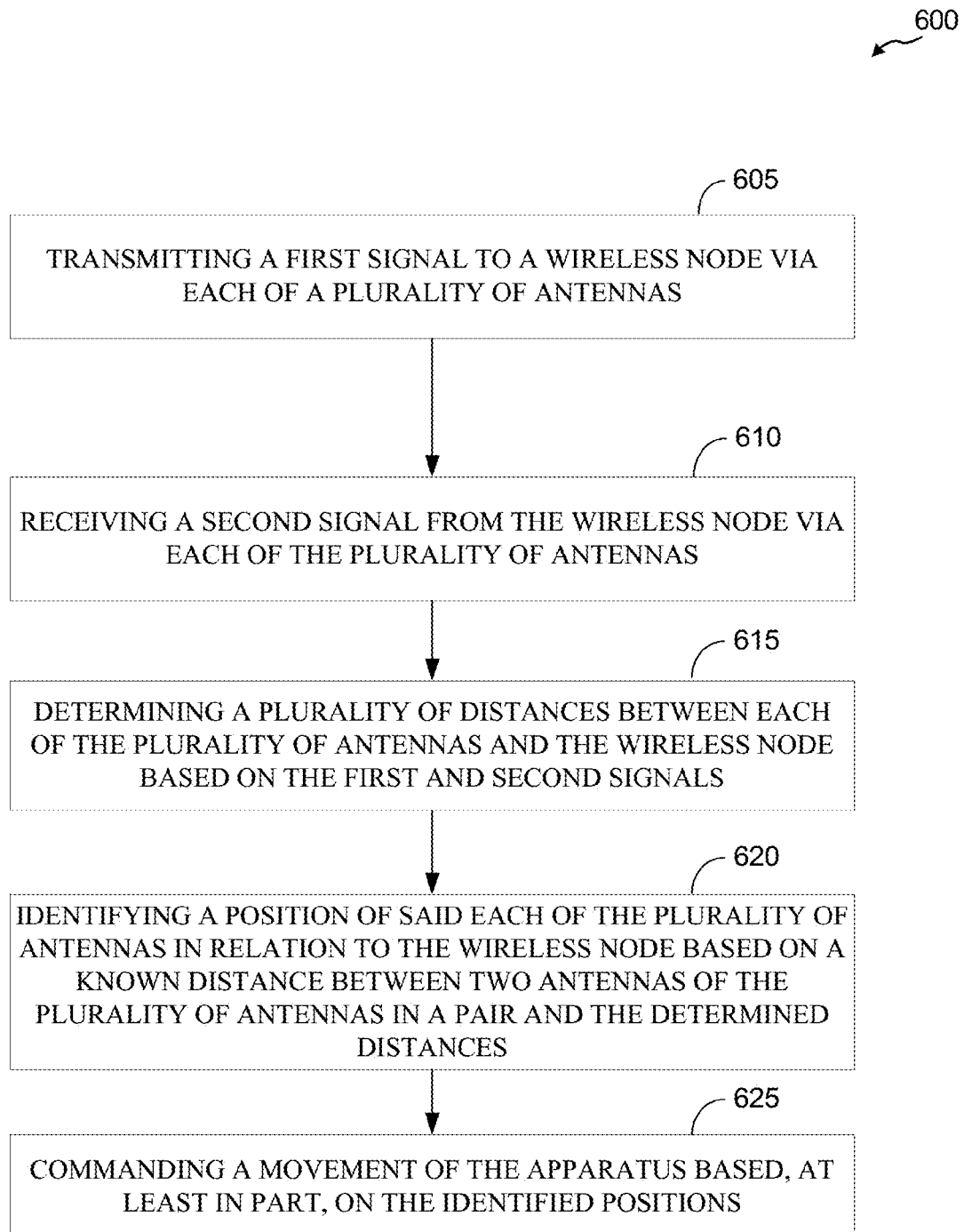
FIG. 6 is a flowchart of a method for determining a position of the mobile device in relation to the AP in FIG. 2.

FIG. 6 is a process flow diagram of an exemplary method 600 for wireless communication, in accordance with certain aspects of the present disclosure. For example, the method could be performed by the system 200 illustrated in FIG. 2. Method 500 may be performed by the mobile device 210 (FIG. 2) in some aspects. The method 500 may also be performed by the AP 105 or STAs (e.g., mobile devices) 110 shown in FIG. 1; a person having ordinary skill in the art will appreciate that the method 500 may be implemented by other suitable devices and systems. Although the method 500 is described herein with reference to a particular order, in various aspects, blocks herein may be performed in a different order, or omitted, and additional blocks may be added.

Operation block 605 includes transmitting a first signal to an wireless node via each of a plurality of antennas of an apparatus. Operation block 610 includes receiving a second signal from the wireless node via each of the plurality of antennas. Operation block 615 includes determining a plurality of distances between each of the plurality of antennas and the wireless node based on the first and second signals. Operation block 620 includes identifying a position of each of the plurality of antennas in relation to the wireless node based on a known distance between two antennas of the plurality of antennas in a pair and the determined distances. Operation block 625 includes commanding a movement of the apparatus based, at least in part, on the identified positions.

An apparatus for wireless communication may perform one or more of the functions of method 600, in accordance with certain aspects described herein. The apparatus may comprise a plurality of means for transmitting and receiving signals. In certain aspects, the plurality of means for transmitting and receiving signals can be implemented by the antenna diversity system 316 (FIG. 3) or the antenna modules 205 (FIGS. 2 and 4), the processor 304, a processing system, or the transceiver 314. In certain aspects, the means for transmitting and receiving signals can be configured to perform the functions of blocks 605 and 610 (FIG. 6). The apparatus may comprise means for determining a plurality of distances between each of the plurality of means for transmitting and receiving signals and an wireless node based on the first and second signals. In certain aspects, the means for determining the plurality of distances can be implemented by the processor 304 or the processing system. In certain aspects, the means for determining the plurality of distances can be configured to perform the functions of block 615 (FIG. 6).

In some aspects, the apparatus may further comprise means for identifying a position of said each of the plurality of means for transmitting and receiving signals in relation to the wireless node based on a known distance between two means for transmitting and receiving signals of the plurality of means for transmitting and receiving signals in a pair and the determined distances. In certain aspects, the means for identifying can be implemented by the processor 304 (FIG. 3) or the processing system. In certain aspects, the means for identifying can be configured to perform the functions of block 620 (FIG. 6). In some aspects, the apparatus may further comprise means for commanding a movement of the apparatus based, at least in part, on the identified positions. In certain aspects, the means for tracking can be implemented by the processor 304 (FIG. 3) or the processing system. In certain aspects, the means for commanding can be configured to perform the functions of block 625 (FIG. 6).

As used herein, the term interface may refer to hardware or software configured to connect two or more devices together. For example, an interface may be a part of a processor or a bus and may be configured to allow communication of information or data between the devices. The interface may be integrated into a chip or other device. For example, in some aspects, an interface may comprise a receiver configured to receive information or communications from a device at another device. The interface (e.g., of a processor or a bus) may receive information or data processed by a front end or another device or may process information received. In some aspects, an interface may comprise a transmitter configured to transmit or communicate information or data to another device. Thus, the interface may transmit information or data or may prepare information or data for outputting for transmission (e.g., via a bus).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, aa, bb, cc, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, a processing system, an integrated circuit ("IC"), an access terminal, or an access point or any combination thereof designed to perform the functions described herein. A processing system may be implemented using one or more ICs or may be implemented within an IC (e.g., as part of a system on a chip). In some aspects, the IC may comprise a general purpose processor, a DSP, an ASIC, an FPGA or other PLD, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. Thus, in some aspects, computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Software or instructions may also be transmitted over a transmission medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. An apparatus for wireless communications, comprising:
   a plurality of antennas; and a processing system configured to:
   transmit a first signal to a wireless node via each of the plurality of antennas;
   receive a second signal from the wireless node via each of the plurality of antennas;
   determine a plurality of distances between each of the plurality of antennas and the wireless node based on the first and second signals;
   identify a position of said each of the plurality of antennas in relation to the wireless node based, at least in part, on a known distance between two antennas of the plurality of antennas in a pair and the determined distances, and
   command a movement of the apparatus based, at least in part, on the identified positions.

2. The apparatus of claim 1, wherein the determination is based on timings of the first and second signals communicated between the plurality of antennas and the wireless node, the timings based on at least one of a fine time, an observed time difference of arrival (OTDOA), a single ended round trip time (RTT), or a path loss procedure between each antenna of the plurality of antennas and the wireless node.

3. The apparatus of claim 1, further comprising one or more sensors configured to provide information regarding an orientation of the apparatus, wherein the processing system is further configured to use the orientation of the apparatus, along with the determined distances between each of the plurality of antennas and the wireless node, when identifying a position of said each of the plurality of antennas in relation to the wireless node.

4. The apparatus of claim 3, wherein the one or more sensors comprise a tilt sensor configured to provide information regarding a tilt or angle of the apparatus with reference to a horizon, wherein the identification of the position of said each of the plurality of antennas in relation to the wireless node is based, at least in part, on the tilt or angle of the apparatus.

5. The apparatus of claim 1, wherein the processing system and the plurality of antennas have a resolution distance less than all known distances between two antennas of the plurality of antennas in pairs, such that each of the plurality of antennas has a unique position in relation to the others of the plurality of antennas.

6. The apparatus of claim 5, wherein the resolution distance is less than 2 cm.

7. The apparatus of claim 1, further comprising one or more switching circuits configured to couple one of the plurality of antennas to the processing system at a specific time while decoupling the others of the plurality of antennas at the specific time.

8. The apparatus of claim 1, wherein each of the plurality of antennas is configured to communicate with the wireless node at a different time such that only one antenna of the plurality of antennas is transmitting or receiving at any given time.

9. The apparatus of claim 1, further comprising:
   a housing, wherein the plurality of antennas are disposed in relation to the housing, further wherein the processing system is disposed within the housing, and further wherein the apparatus is configured as a gaming system.

10. A method for wireless communications, comprising:
    transmitting a first signal to a wireless node via each of a plurality of antennas of an apparatus;
    receiving a second signal from the wireless node via each of the plurality of antennas;
    determining a plurality of distances between each of the plurality of antennas and the wireless node based on the first and second signals;
    identifying a position of said each of the plurality of antennas in relation to the wireless node based on a known distance between two antennas of the plurality of antennas in a pair and the determined distances; and
    commanding a movement of the apparatus based, at least in part, on the identified positions.

11. The method of claim 10, wherein the determination is based on timings of the first and second signals communicated between the plurality of antennas and the wireless node, the timings based on, at least one of, a fine time, an observed time difference of arrival (OTDOA), a single ended round trip time (RTT), or a path loss procedure between each antenna of the plurality of antennas and the wireless node.

12. The method of claim 10, further comprising determining an orientation of said each of the plurality of antennas via one or more sensors, wherein the identification of the position of each of the plurality of antennas uses the orientation of each antenna of the plurality of antennas, along with the determined distances between each of the plurality of antennas and the wireless node, when identifying the position of said each of the plurality of antennas in relation to the wireless node.

13. The method of claim 12, wherein determining the orientation of said each of the plurality of antennas via the one or more sensors comprises determining a tilt or angle of the plurality of antennas with reference to a horizon, and wherein the identification of the position of said each of the plurality of antennas in relation to the wireless node is based, at least in part, on the tilt or angle of the plurality of antennas.

14. The method of claim 10, wherein identifying a position of the plurality of antennas in relation to the wireless node comprises identifying a position of the plurality of antennas in relation to the wireless node with a resolution distance less than all of the known distances between two antennas of the plurality of antennas in pairs, and further comprising identifying a unique position for each antenna of the plurality of antennas in relation to the others of the plurality of antennas.

15. The method of claim 14, wherein the resolution distance is less than 2 cm.

16. The method of claim 10, further comprising coupling one antenna of the plurality of antennas to a processing system at a specific time while decoupling all the others of the plurality of antennas at the specific time such that only the coupled antenna transmits the first or receives the second signal at the specific time.

17. The method of claim 10, wherein each of the plurality of antennas is configured to communicate with the wireless node at a different time such that only one antenna of the plurality of antennas is transmitting or receiving at any given time.

18. A drone, comprising:
a housing;
a plurality of antennas disposed in relation to the housing; and
a processing system disposed within the housing and configured to:
  transmit a first signal to a wireless node via each of the plurality of antennas;
  receive a second signal from the wireless node via each of the plurality of antennas;
  determine a plurality of distances between each of the plurality of antennas and the wireless node based on the first and second signals;
  identify a position of said each of the plurality of antennas in relation to the wireless node based, at least in part, on a known distance between two antennas of the plurality of antennas in a pair and the determined distances, and
  direct the drone to a position in relation to the wireless node based, at least in part, on the identified positions.

* * * * *